United States Patent [19]

Naitoh et al.

[11] Patent Number: 4,758,929
[45] Date of Patent: Jul. 19, 1988

[54] SOLID ELECTROLYTE CAPACITOR AND PROCESS FOR PREPARATION THEREOF

[75] Inventors: Kazumi Naitoh; Yoshiaki Arakawa, both of Yokohama; Haruyoshi Watanabe, Ushiku, all of Japan

[73] Assignee: Showa Denki Kabushiki Kaisha, Tokyo, Japan

[21] Appl. No.: 117,720

[22] Filed: Nov. 6, 1987

[30] Foreign Application Priority Data

Nov. 8, 1986 [JP]  Japan ............................. 61-266092
Feb. 24, 1987 [JP]  Japan ............................. 62-39205

[51] Int. Cl.$^4$ ............................................ H01G 9/00
[52] U.S. Cl. ................................. 361/433; 29/570.1
[58] Field of Search ....................... 29/570.1; 361/433

[56] References Cited

U.S. PATENT DOCUMENTS 3,649,878  3/1972  Schneider ......................... 361/433
4,648,010  3/1987  Naitoh et al. ..................... 361/433

FOREIGN PATENT DOCUMENTS 76361  7/1978  Japan ............................ 29/570.1
33142  9/1978  Japan ............................ 29/570.1
12447  1/1979  Japan ............................. 361/433
83020  7/1981  Japan ............................. 361/433

Primary Examiner—Donald A. Griffin
Attorney, Agent, or Firm—Sughrue, Mion, Zinn, Macpeak & Seas

[57] ABSTRACT

Disclosed is a solid electrolyte capacitor comprising a positive electrode substrate composed of a metal having a valve action, and a dielectric oxide film, a semiconductor layer and an electroconductive layer, which are formed in order on the positive electrode substrate, wherein the electroconductive layer is a layer of a paste composed mainly of a metal oxide powder, a metal powder and an optional metal salt powder. This capacitor has a good and durable stability at a high temperature. In the process for the preparation of this capacitor, preferably the semiconductor layer formed on the dielectric oxide film is subjected to ultrasonic washing.

17 Claims, No Drawings

SOLID ELECTROLYTE CAPACITOR AND PROCESS FOR PREPARATION THEREOF

BACKGROUND OF THE INVENTION

1. Field of the Invention

The present invention relates to a solid electrolyte capacitor having an excellent stability at a high temperature.

2. Description of the Related Art

An element of a solid electrolyte capacitor generally has a structure such that an oxide film layer is formed on a positive electrode substrate composed of a metal having a valve action, a semiconductor layer composed of a semiconductor material such as manganese dioxide is formed as a counter electrode on the outer surface of this oxide film layer, and a conductor layer is formed on the semiconductor layer by using a silver paste or the like to reduce the contact resistance.

This solid electrolyte capacitor, however, has a disadvantage in that, if the capacitor is subjected to a high-temperature long-period life test, the loss coefficient is increased with the lapse of time.

SUMMARY OF THE INVENTION

Under this background, a primary object of the present invention is to provide a solid electrolyte capacitor in which a good stability at a high temperature can be maintained over a long period.

More specifically, in accordance with one aspect of the present invention, there is provided a solid electrolyte capacitor comprising a positive electrode substrate composed of a metal having a valve action, and a dielectric oxide film, a semiconductor layer, and an electroconductive layer, which are formed in this order on the positive electrode substrate, wherein the electroconductive layer is a layer of a paste composed mainly of a metal oxide powder and a metal powder.

In accordance with another aspect of the present invention, there is provided an improvement in a process for the preparation of a solid electrolyte capacitor, which comprises forming a dielectric oxide film, a semiconductor layer, and an electroconductive layer in this order on the surface of a positive electrode substrate composed of a metal having a valve action, wherein the improvement comprises subjecting the surface of the semiconductor layer formed on the dielectric oxide film to ultrasonic washing, and then forming a paste layer composed mainly of a metal oxide powder and a metal powder on the washed surface as the electroconductive layer.

DESCRIPTION OF THE PREFERRED EMBODIMENTS

As the valve metal substrate used as the positive electrode of the solid electrolyte capacitor of the present invention, any metal having a valve action, such as aluminum, tantalum, niobium, titanium and alloys thereof, can be used.

A layer of an oxide of the positive electrode per se formed in the surface portion of the positive electrode substrate or a layer of another dielectric oxide formed on the surface of the positive electrode can be used as the oxide film layer on the surface of the positive electrode substrate. A layer composed of an oxide of the positive electrode valve metal is especially preferred. In each case, a known method, for example, an anodic forming method using a liquid electrolyte, can be adopted for forming the oxide layer.

The composition of the semiconductor layer used in the present invention and the method for the preparation thereof are not particularly critical. However, in order to enhance the capacitor performance, preferably a semiconductor layer composed mainly of lead dioxide or a mixture of lead dioxide and lead sulfate is prepared according to a known chemical or electrochemical deposition method.

As the chemical deposition method, there can be mentioned, for example, a method in which a semiconductor layer is deposited from a reaction mother liquid containing a lead-containing compound and an oxidant.

As the lead-containing compound, there can be mentioned lead-containing compounds in which a lead atom is coordination-bonded or ion-bonded to a chelate-forming compound such as oxine, acetylacetone, pyromeconic acid, salicylic acid, alizarin, polyvinyl acetate, a porphyrin compound, a crown compound or a cryptate compound; and lead citrate, lead acetate, basic lead acetate, lead chloride, lead bromide, lead perchlorate, lead sulfamate, lead hexafluorosilicate, lead bromate, lead borofluoride, lead acetate hydrate and lead nitrate. An appropriate lead-containing compound is selected according to the kind of solvent used for the reaction mother liquid. Water or an organic solvent can be used as the solvent. A mixture of two or more of lead-containing compounds as described above can be used.

The concentration of the lead-containing compound in the reaction mother liquid is from 0.05 mole/l to a concentration giving a saturation solubility, preferably from 0.1 mole/l, to a concentration giving a saturation solubility, especially preferably from 0.5 mole/l, to a concentration giving a saturation solubility. If the concentration of the lead-containing compound in the reaction mother liquid is lower than 0.05 mole/l, a solid electrolyte capacitor having a good performance cannot be obtained. If the concentration of the lead-containing compound in the reaction mother liquid exceeds the level giving the saturation solubility, no advantage is gained by increasing the amount of the added lead-containing compound.

As the oxidant, there can be mentioned, for example, quinone, chloranil, pyridine-N-oxide, dimethyl sulfoxide, chromic acid, potassium permanganate, selenium oxide, mercury acetate, vanadium oxide, sodium chlorate, ferric chloride, hydrogen peroxide, bleaching powder, and benzoyl peroxide. An appropriate oxidant is selected according to the kind of oxidant, and a mixture of two or more of oxidants as described above can be used.

The oxidant is used preferably in an amount of 0.1 to 5 moles per mole of the lead-containing compound used. If the amount of the oxidant used is larger than 5 moles per mole of the lead-containing compound, no advantage is gained from the economical viewpoint. If the amount of the oxidant is smaller than 0.1 mole per mole of the lead-containing compound, a solid electrolyte capacitor having a good performance cannot be obtained.

As the method for forming the semiconductor layer composed mainly of lead dioxide, there can be mentioned a method in which a solution of a lead-containing compound is mixed with a solution of an oxidant to form a reaction mother liquid and the positive electrode substrate having the above-mentioned oxide film on the surface thereof is immersed in the reaction mother liquid to chemically deposit a semiconductor composed mainly of lead dioxide.

As the electrochemical deposition method, there can be mentioned, for example, a method in which lead dioxide is deposited from a liquid electrolyte containing a lead-containing compound at a high concentration by electrolytic oxidation, as previously proposed by the present inventors (Japanese Patent Application No. 61-26,952).

If the semiconductor layer is a layer composed mainly of lead dioxide inherently acting as a semiconductor and lead sulfate which is an insulating substance, the leak current value of the capacitor can be reduced by the incorporation of lead dioxide. On the other hand, the electroconductivity of the semiconductor layer is reduced by the incorporation of lead sulfate and, therefore, the loss coefficient value is increased. However, according to the present invention, it has been found that by using lead sulfate as well as lead dioxide for the formation of the semiconductor layer, the performance of the resulting capacitor can be maintained at a level as high as those of the conventional solid electrolyte capacitors. Accordingly, a good capacitor performance can be manifested in such a broad composition ratio that, in the formed semiconductor layer, the amount of lead dioxide is at least 10 parts by weight and the amount of lead sulfate is up to 90 parts by weight. In view of a balance between the leak current value and the loss coefficient value, preferably the amount of lead dioxide is 20 to 50 parts by weight, especially 25 to 35 parts by weight, and the amount of lead sulfate is 80 to 50 parts by weight, especially 75 to 65 parts by weight. If the amount of lead dioxide is smaller than 10 parts by weight, the electroconductivity is increased and the loss coefficient value is therefore increased, and furthermore, a sufficient capacitance cannot be attained.

The semiconductor layer composed mainly of lead dioxide and lead sulfate can be formed by chemical deposition from an aqueous solution containing a lead ion and a persulfate ion as the reaction mother liquid. Furthermore, an oxidant free of a persulfate ion may be incorporated in the reaction mother liquid.

The lead ion concentration in the reaction mother liquid is from 0.05 mole/l, to a concentration giving the saturation solubility, preferably from 0.1 mole/l, to a concentration giving the saturation solubility, especially from 0.5 mole/l, to a concentration giving the saturation solubility. If the lead ion concentration in the reaction mother liquid exceeds the level giving the saturation solubility, no advantage can be gained by the increased amount of the lead ion. If the lead ion concentration is lower than 0.05 mole/l, since the amount of the lead ion in the reaction mother liquid is too small, the deposition frequency will be disadvantageously increased.

The concentration of the persulfate ion in the reaction mother liquid is such that the molar ratio of the persulfate ion to the lead ion is from 0.05 to 5. If the molar ratio of the persulfate ion to the lead ion is higher than 5, unreacted persulfate ion remains and therefore, the manufacturing cost is high. If the molar ratio of the persulfate ion to the lead ion lower than 0.05, unreacted lead ion remains and the electroconductivity is therefore poor.

As the compound giving the lead ion seed, there can be mentioned. For example, lead citrate, lead perchlorate, lead nitrate, lead acetate, basic lead acetate, lead chlorate, lead sulfamate, lead hexafluorosilicate, lead bromate, lead chloride, and lead bromide. A mixture of two or more of these compounds can be used.

As the compound giving the persulfate ion seed, there can be mentioned, for example, potassium persulfate, sodium persulfate, and ammonium persulfate. A mixture of two or more of these compounds can be used.

For example, hydrogen peroxide, calcium hypochlorite, calcium chlorite, calcium chlorate, and calcium perchlorate can be mentioned as the oxidant.

Preferably, the surface of the so-formed semiconductor layer is washed by ultrasonic washing before formation of the electroconductive layer on the semiconductor layer. Water or an organic solvent such as an alcohol is used as the medium for ultrasonic washing. The output, temperature, and time for ultrasonic washing depend on the kind of positive electrode substrate used, the kind and composition of the formed semiconductor layer, and other factors, and therefore, are determined based on the results of preliminary experiments. In addition to ultrasonic washing, such steps as washing with an organic solvent such as ethyl alcohol or methyl alcohol and water washing may be employed in combination in the preparation process. By combining these washing steps, the effect of ultrasonic washing can be increased.

The electroconductive layer formed on the semiconductor layer is a paste layer composed mainly of a mixture of a metal oxide powder and a metal powder. A powder of the metal oxide forming the semiconductor layer is especially preferred as the metal oxide powder. Furthermore, the electroconductive layer formed on the semiconductor layer may be a paste layer composed mainly of a powdery mixture of the metal oxide forming the semiconductor layer and a metal salt powder, and a metal powder. As the metal oxide, there can be mentioned, for example, manganese dioxide, tin dioxide, tungsten dioxide, lead dioxide, copper mono-oxide, zinc mono-oxide, nickel-mono-oxide, cobalt mono-oxide, titanium dioxide, di-iron trioxide, barium titanate, tantalum oxide, divanadium trioxide, and tungsten trioxide. Lead dioxide is especially preferable from the viewpoint of the electroconductivity. As the metal powder, there can be mentioned, for example, a silver powder, a gold powder, a palladium powder, a copper powder, a nickel powder, a silver-copper alloy powder, a silver-nickel alloy powder, a silver-coated copper powder, a silver-coated nickel powder, a silver-coated carbon powder, and powders of alloys thereof.

In order to improve the electroconductivity of the electroconductive paste, preferably the metal powder has a leaf-like shape or a coral-like shape, but a metal powder having an ordinary spherical shape or a shape resembling the spherical shape can be used.

Preferably, a part of the metal oxide powder to be mixed with the metal powder for formation of the electroconductive paste is substituted by a powder of a metal salt. As the metal salt, there can be mentioned, for example, sulfates such as magnesium sulfate, cobalt sulfate, lead sulfate, copper sulfate, and nickel sulfate, and carbonates such as magnesium carbonate. Of these salts, lead sulfate is most preferred.

Preferably, the weight ratio of the metal oxide powder or the mixture of the metal oxide powder and the metal salt powder to the metal powder in the electroconductive paste is from 1/6 to 6. If the amount of the metal oxide powder or the mixture of the metal oxide powder and the metal salt powder is smaller than 1/6 of the amount of the metal powder, there is a tendency toward a reduction of the stability of the solid electrolyte capacitor at a high temperature. If the amount of the metal oxide powder or the mixture of the metal oxide powder and the metal salt powder is more than 6 times the amount of the metal powder, there is a tendency toward a reduction of the electroconductivity.

It is presumed that the action of the mixture of the metal powder with the metal oxide powder or with the mixture of the metal oxide powder and the metal salt powder will probably be as follows. Namely, the electroconductivity of the metal oxide powder or the mixture of the metal oxide powder and the metal salt powder is about 1/100 to about 1/1,000 of the electroconductivity of the metal powder, but when the metal oxide powder or the mixture of the metal oxide powder and the metal salt powder is dispersed in the paste together with the metal powder, the electroconductivity is not reduced as much as that of the electroconductivity of the paste obtained by dispersing the metal powder alone. In connection with the stability at high temperatures, the thermal expansion coefficient of the paste, which is an organic polymeric material, is large and to prevent a generation of heat stress, it is important to decrease this coefficient. The metal oxide powder or the mixture of the metal oxide powder and the metal salt powder exerts an effect of decreasing the thermal expansion coefficient.

Where the mixture of the metal oxide powder and the metal salt powder is used, preferably the proportion of the metal salt powder in the mixture is up to 70% by weight, especially up to 55% by weight.

The paste comprising, as the main components, the metal powder and the metal oxide powder or the mixture of the metal oxide powder and the metal salt powder is prepared, for example, by mixing lead dioxide and the metal powder, or, by mixing lead dioxide, an insulating lead compound such as lead sulfate, and the metal powder, where the semiconductor layer is composed mainly of lead dioxide, with an appropriate resin or oligomer with the aid of a solvent.

Any resins or oligomers used for known electroconductive pastes can be used as the resin or oligomer. For example, there can be mentioned an acrylic resin, an alkyd resin, a fluorine resin, a vinyl resin, a silicone resin, an epoxy resin, a urethane resin, a novolak resin or a resol resin. Any of known solvents capable of dissolving therein the resin or oligomer used can be used. If the resin or oligomer is liquid, a solvent need not be used. Moreover, in the case of a thermosetting resin or oligomer, a known curing agent may be added, and a method may be adopted in which a liquid containing a curing agent is separately prepared and the liquid is incorporated into the paste at the time of application.

The proportion of the mixture of the metal powder with the metal oxide powder or with the metal oxide powder and the metal salt powder (collectively referred to as "powder" hereinafter) in the paste is preferably 35 to 95% by weight and especially preferably 55 to 95% by weight. If the proportion of the powder is smaller than 35% by weight, the electroconductivity of the paste is poor. If the proportion of the powder exceeds 95% by weight, the adhesiveness of the paste is poor. In each case, the performance of the solid electrolyte capacitor is degraded.

The solid electrolyte capacitor of the present invention having the above-mentioned structure is formed into a general-purpose capacitor by using a resin mold, a resin case, an exterior case of a metal or an exterior casing obtained by resin dipping or film lamination.

The present invention will now be described in detail with reference to the following examples and comparative examples. Note, in these examples, all of "parts" are by weight.

EXAMPLE 1

The surface of an aluminum foil having a length of 2 cm and a width of 0.5 cm was electrochemically etched by an alternating current by using the aluminum foil as the positive electrode, and a positive electrode terminal was caulked and connected to the etched aluminum foil. Then, the etched aluminum foil was electrochemically treated in an aqueous solution of boric acid and ammonium borate to form an aluminum oxide film, whereby an etched and formed aluminum foil for a low voltage having a capacitance of about 1.0 $\mu F/cm^2$ was obtained. The formed foil was then immersed in an aqueous solution containing 1 mole/l of lead acetate trihydrate, and dilute aqueous solution containing hydrogen peroxide in an amount of 0.5 mole per mole of lead acetate trihydrate was added to the aqueous solution. The foil was allowed to stand for 1 hour. The lead dioxide layer deposited on the formed foil was subjected to ultrasonic washing in water for 3 minutes, and the washed formed foil was then dried at 120° C. under a reduced pressure. The formed foil was immersed in a paste comprising 32 parts of a silver powder, 60 parts of lead dioxide and 8 parts of a urethane resin in butyl acetate as the solvent, and the formed foil was drawn up from the paste and dried at 100° C. A negative electrode was connected to the foil with the above-mentioned paste and the opening was sealed with a resin to obtain a solid electrolyte capacitor.

EXAMPLE 2

The same formed foil as used in Example 1, except for the positive electrode, was immersed in a liquid mixture (reaction mother liquid) of an aqueous solution containing 2.4 mole/l of lead acetate trihydrate and an aqueous solution containing 4 mole/l of ammonium persulfate, and reaction was carried out at 80° C. for 30 minutes. The semiconductor layer composed of lead dioxide and lead sulfate, which was thus formed on the dielectric oxide film, was subjected to ultrasonic washing in water for 3 minutes and dried at 120° C. under a reduced pressure. Mass analysis, X-ray analysis, and infrared spectroscopic analysis confirmed that the formed semiconductor layer was composed of lead dioxide and lead sulfate and lead dioxide was contained in an amount of about 25% by weight.

Then a paste comprising 30 parts of a silver powder, 60 parts of lead dioxide and 10 parts of an acrylic resin was coated and dried on the semiconductor layer, and in the same manner as described in Example 1, a negative electrode was then connected and the opening was sealed with a resin to obtain a solid electrolyte capacitor.

EXAMPLE 3

A semiconductor layer was prepared in the same manner as described in Example 2 except that an aqueous solution containing 0.05 mole/l of hydrogen peroxide was further added to the reaction mother liquid for the formation of the semiconductor layer. It was confirmed that the semiconductor layer was composed of lead dioxide and lead sulfate and lead dioxide was contained in an amount of about 50% by weight.

A paste comprising 25 parts of a silver powder, 65 parts of lead dioxide and 10 parts of an acrylic resin was coated and dried on the formed foil having the semiconductor layer deposited thereon, and the post treatment was carried out in the same manner as described in Example 2 to obtain a solid electrolyte capacitor.

EXAMPLE 4

In the same manner as described in Example 2, a semiconductor layer composed of lead dioxide and lead sulfate was prepared, and the semiconductor layer was subjected to ultrasonic washing in water for 3 minutes. It was confirmed that lead dioxide was contained in an amount of about 25% by weight.

A paste comprising 30 parts of a silver powder, 50 parts of lead dioxide, 10 parts of lead sulfate, and 10 parts of an acrylic resin was coated and dried on the semiconductor layer, and in the same manner as described in Example 1, a negative electrode was connected and the opening was sealed with a resin to obtain a solid electrolyte capacitor.

COMPARATIVE EXAMPLE 1

A solid electrolyte was prepared in the same manner as described in Example 1 except that the lead dioxide was not added to the paste and the amounts of silver powder and the urethane resin in the paste were changed to 92 parts and 8 parts, respectively.

EXAMPLE 5

A solid electrolyte capacitor was prepared in the same manner as described in Example 1 except that ultrasonic washing was not carried out.

EXAMPLE 6

The procedures of Example 1 were repeated except that the thickness of the aluminum oxide film was changed so that an etched and formed aluminum foil for a low-voltage capacity having a capacitance of about 0.5 $\mu F/cm^2$ was obtained. Then, a lead dioxide layer was formed on the aluminum foil and ultrasonic waves were not applied in the washing of the semiconductor layer.

EXAMPLE 7

A formed foil prepared in the same manner as described in Example 6, except the positive electrode terminal lead line, was immersed in a liquid mixture (reaction mother liquid) of an aqueous solution containing 2.4 mole/l of lead acetate trihydrate and an aqueous solution containing 4 mole/l of ammonium persulfate, and reaction was carried out at 80° C. for 30 minutes. The formed semiconductor layer composed of lead dioxide and lead sulfate, which was formed on the dielectric oxide film layer, was washed with water and dried at 120° C. under a reduced pressure.

Mass analysis, X-ray analysis, and infrared spectroscopic analysis confirmed that the formed semiconductor layer was composed of lead dioxide and lead sulfate and the content of lead dioxide was about 25% by weight.

Then, a paste comprising 50 parts of a silver-coated copper powder, 40 parts of lead dioxide and 10 parts of an acrylic resin was coated and dried on the semiconductor layer, and in the same manner as described in Example 1, a negative electrode was connected and the opening was sealed with a resin to obtain a solid electrolyte capacitor.

EXAMPLE 8

A semiconductor layer was prepared in the same manner as described in Example 7 except that an aqueous solution containing 0.05 mole/l of hydrogen peroxide was added to the reaction mother liquid at the semiconductor layer-forming step. It was confirmed that the semiconductor layer was composed of lead dioxide and lead sulfate and the lead dioxide content was about 50% by weight.

A paste comprising 24 parts of a silver powder, 66 parts of lead dioxide, and 10 parts of an acrylic resin was coated and dried on the formed foil having the semiconductor layer formed thereon. The post treatment was carried out in the same manner as described in Example 7 to obtain a solid electrolyte capacitor.

EXAMPLE 9

In the same manner as described in Example 7, a semiconductor layer composed of lead dioxide and lead sulfate was prepared. It was found that the content of lead dioxide was about 25% by weight.

A paste comprising 50 parts of a silver-coated copper powder, 20 parts of lead dioxide, 20 parts of lead sulfate and 10 parts of an acrylic resin was coated and dried on the semiconductor layer, and in the same manner as described in Example 6, a negative electrode was connected and the opening was sealed with a resin to obtain a solid electrolyte capacitor.

COMPARATIVE EXAMPLE 2

A solid electrolyte capacitor prepared in the same manner as described in Example 6 except that lead dioxide was not added to the paste and a paste comprising 92 parts of a silver powder and 8 parts of a urethane resin was used.

The characteristic values of the solid electrolyte capacitors prepared in Examples 1 through 9 and Comparative Examples 1 and 2 are collectively shown in Table 1.

TABLE 1

|  | Values at KHz | | Values at 10 KHz after Standing at 125° C. for 1,000 Hours | | Values at 10 KHZ after Standing at 125° C. for 2,000 Hours | |
| --- | --- | --- | --- | --- | --- | --- |
|  | Capacitance ($\mu F$) | tan δ (%) | Capacitance ($\mu F$) | tan δ (%) | Capacitance ($\mu F$) | tan δ (%) |
| Example 1 | 0.9 | 4.3 | 0.9 | 4.6 | 0.9 | 4.8 |
| Example 2 | 1.2 | 4.5 | 1.2 | 4.7 | 1.1 | 5.0 |
| Example 3 | 1.1 | 4.3 | 1.1 | 4.6 | 1.0 | 5.0 |
| Example 4 | 1.1 | 4.2 | 1.1 | 4.5 | 1.0 | 4.8 |
| Comparative Example 1 | 0.9 | 4.6 | 0.9 | 12.3 | 0.8 | 15.8 |
| Example 5 | 0.9 | 4.8 | 0.9 | 5.2 | 0.8 | 8.8 |
| Example 6 | 1.1 | 3.9 | 1.0 | 4.3 | 0.9 | 8.2 |
| Example 7 | 1.3 | 4.1 | 1.1 | 4.6 | 1.0 | 8.5 |
| Example 8 | 1.2 | 3.8 | 1.1 | 4.3 | 1.0 | 8.0 |
| Example 9 | 1.4 | 4.3 | 1.2 | 4.8 | 1.1 | 8.6 |
| Comparative Example 2 | 1.1 | 3.7 | 0.9 | 11.3 | 0.6 | 25.7 |

As is apparent from the data shown in Table 1, a solid electrolyte capacitor having, as the semiconductor layer, a paste layer containing a metal powder and a metal oxide powder or a mixture of a metal oxide powder and a metal salt powder has an improved stability at a high temperature and a good performance.

We claim:

1. An improvement in a solid electrolyte capacitor comprising a positive electrode substrate composed of a metal having a valve action, and a dielectric oxide film, a semiconductor layer and an electroconductive layer, which are formed in that order on the positive electrode substrate, wherein the improvement comprises a layer of a paste composed mainly of a metal oxide powder and a metal powder as the electroconductive layer.

2. A solid electrolyte capacitor as set forth in claim 1, wherein the weight ratio of the amount of the metal oxide powder to the amount of the metal powder is from 1/6 to 6.

3. A solid electrolyte capacitor as set forth in claim 1, wherein the semiconductor layer is a layer composed mainly of lead dioxide.

4. A solid electrolyte capacitor as set forth in claim 1, wherein the semiconductor layer is a layer composed mainly of lead dioxide and lead sulfate.

5. A solid electrolyte capacitor as set forth in claim 1, wherein the metal oxide powder is a lead dioxide powder.

6. A solid electrolyte capacitor as set forth in claim 1, wherein the electroconductive layer is a layer of a paste composed mainly of a metal oxide powder, a metal salt powder and a metal powder.

7. A solid electrolyte capacitor as set forth in claim 6, wherein the weight ratio of the total amount of the metal oxide powder and the metal salt powder to the amount of the metal powder is from 1/6 to 6 and the amount of the metal salt powder is up to 70% by weight based on the total amount of the metal oxide powder and metal salt powder.

8. A solid electrolyte capacitor as set forth in claim 6, wherein the semiconductor layer is a layer composed mainly of lead dioxide and the electroconductive layer contains at least lead dioxide as the metal oxide and lead sulfate as the metal salt.

9. A solid electrolyte capacitor as set forth in claim 6, wherein the semiconductor layer is a layer composed mainly of lead dioxide and lead sulfate, and the electroconductive layer contains at least lead dioxide as the metal oxide and lead sulfate as the metal salt.

10. An improvement in a process for the preparation of a solid electrolyte capacitor, which comprises forming a dielectric oxide film, a semiconductor layer and an electroconductive layer in order on the surface of a positive electrode substrate composed of a metal having a valve action, wherein the improvement comprises subjecting to ultrasonic washing the surface of the semiconductor layer formed on the dielectric oxide film, and then forming on the washed surface a paste layer composed mainly of a metal oxide powder and a metal powder as the electroconductive layer.

11. A process for the preparation of a solid electrolyte capacitor according to claim 10, wherein the semiconductor layer is a layer composed mainly of lead dioxide.

12. A process for the preparation of a solid electrolyte capacitor according to claim 10, wherein the semiconductor layer is a layer composed of lead dioxide and lead sulfate.

13. A process for the preparation of a solid electrolyte capacitor according to claim 10, wherein the metal oxide powder is a lead dioxide powder.

14. A process for the preparation of a solid electrolyte capacitor according to claim 10, wherein the electroconductive layer is a layer of a paste composed of a metal oxide powder, a metal salt powder and a metal powder.

15. A process for the preparation of a solid electrolyte capacitor according to claim 14, wherein the weight ratio of the total amount of the metal oxide powder and the metal salt powder to the amount of the metal powder is from 1/6 to 6 and the amount of the metal salt powder is up to 70% by weight based on the total amount of the metal oxide powder and metal salt powder.

16. A process for the preparation of a solid electrolyte capacitor according to claim 14, wherein the semiconductor layer is a layer composed mainly of lead dioxide, and the electroconductive layer contains at least lead dioxide as the metal oxide and lead sulfate as the metal salt.

17. A process for the preparation of a solid electrolyte capacitor according to claim 14, wherein the semiconductor layer is a layer composed mainly of lead dioxide and lead sulfate, and the electroconductive layer contains at least lead dioxide as the metal oxide and lead sulfate as the metal salt.

* * * * *

UNITED STATES PATENT AND TRADEMARK OFFICE
CERTIFICATE OF CORRECTION

PATENT NO. : 4,758,929

DATED : July 19, 1988

INVENTOR(S) : Kazumi Naitoh, Yoshiaki Arakawa, and Haruyoshi Watanabe

It is certified that error appears in the above-identified patent and that said Letters Patent is hereby corrected as shown below:

[73] Assignee: Showa Denko Kabushiki Kaisha,

Tokyo, Japan

Signed and Sealed this

Fourteenth Day of March, 1989

*Attest:*

DONALD J. QUIGG

*Attesting Officer*   *Commissioner of Patents and Trademarks*